US008449933B2

(12) United States Patent
Ekanayake et al.

(10) Patent No.: US 8,449,933 B2
(45) Date of Patent: May 28, 2013

(54) METHOD FOR EXTRACTING JUICE FROM PLANT MATERIAL CONTAINING TERPENE GLYCOSIDES AND COMPOSITIONS CONTAINING THE SAME

(75) Inventors: Athula Ekanayake, Cincinnati, OH (US); Jeffrey John Kester, West Chester, OH (US); Jianjun Justin Li, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1747 days.

(21) Appl. No.: 10/881,341

(22) Filed: Jun. 30, 2004

(65) Prior Publication Data

US 2006/0003053 A1    Jan. 5, 2006

(51) Int. Cl.
*A23L 1/28* (2006.01)

(52) U.S. Cl.
USPC .............. 426/51; 426/49; 426/50; 426/52

(58) Field of Classification Search
USPC .................................... 426/49–52
See application file for complete search history.

(56) References Cited

U.S. PATENT DOCUMENTS

| 3,886,296 A | * | 5/1975 | Brooks et al. ............ 426/325 |
| 5,242,699 A | * | 9/1993 | Bednar et al. ............ 426/302 |
| 5,411,755 A | | 5/1995 | Downton et al. |
| 5,433,965 A | | 7/1995 | Fischer et al. |
| 6,124,442 A | | 9/2000 | Zhou et al. |
| 2007/0116813 A1 | * | 5/2007 | Minatchy et al. ......... 426/489 |

FOREIGN PATENT DOCUMENTS

| FR | 2638064 | * | 4/1990 |
| WO | WO 03/099043 | * | 12/2003 |

OTHER PUBLICATIONS

Grandison, A.S.; Lewis, M.J. (1996). Separation Processes in the Food and Biotechnology Industries—Principles and Applications. (pp. 1-16). Woodhead Publishing. Online version available at: http://knovel.com/web/portal/browse/display?_EXT_KNOVEL_DISPLAY_bookid=308&VerticalID=0.*
PCT International Search Report Dated Oct. 18, 2005—4 pgs.

* cited by examiner

*Primary Examiner* — Vera Stulii
(74) *Attorney, Agent, or Firm* — Kim William Zerby; Adam W. Borgman

(57) ABSTRACT

Processes for extracting juice from plant material containing terpene glycosides comprising the steps of crushing a plant material comprising terpene glycosides, blanching the crushed plant material in acidified water to obtain a puree, the puree comprising a juice extract and a plant solids residue, separating the juice extract from the plant solids residue, mixing enzymes with the juice extract, and separating the juice extract to obtain a sweet juice.

20 Claims, No Drawings

METHOD FOR EXTRACTING JUICE FROM PLANT MATERIAL CONTAINING TERPENE GLYCOSIDES AND COMPOSITIONS CONTAINING THE SAME

FIELD OF THE INVENTION

This invention relates to methods for extracting juice from plant material containing terpene glycosides and the use of this juice in food, beverage and health care compositions.

BACKGROUND OF THE INVENTION

Today's health-conscious consumers are constantly looking for ways to cut calories from their diets without sacrificing taste. As a result, many lower calorie food and beverage products have been created. These products are able to offer the consumer fewer calories because some of the sugar in the product is replaced by artificial sweeteners, such as aspartame. However, these lower calorie products are still not acceptable to many consumers who wish to limit their intake of artificial sweeteners.

It has been discovered that certain naturally-occurring compounds called terpene glycosides, are non-caloric and intensely sweet. This is a very exciting development which means that certain botanical compositions, which contain terpene glycosides, may be used in food, beverage and health care products to deliver low-sugar and low-calorie alternatives to the products currently available to consumers.

Terpene glycosides exist in a variety of plant and botanical sources. One excellent source of terpene glycosides is certain members of the Cucurbitaceae family, and in particular, luo han guo fruit, otherwise known as *Siraitia grosvenorii*.

Luo han guo fruit is produced by the *S. grosvenorii* plant found in southern China. The ripened fresh fruit has a pleasant fruity odor and an intensely sweet flavor. If left to stand for a few weeks without processing, the fresh fruit will degrade. Luo han guo contains triterpene glycosides called mogrosides, which impart the intense sweetness to the fruit. Specifically, luo han guo has been found to contain Mogrosides IV and V, 11-oxomogroside V and siamenoside I. In a purified state, these compounds have sweetness potencies approximately 200-400 times greater than sucrose (dry solids basis). For example, Mogroside V, the principle intensely sweet component in luo han guo fruit, has a sweetness potency of about 250 times that of sucrose.

Traditionally, luo han guo fruits are slowly dried over smoke and stored in the dry state until used. Alternatively, the juice may be concentrated in open kettles to produce candy-like products. The drying process preserves the fruit and removes most of the fresh fruit flavor. The drying also causes the formation of bitter and astringent off-flavors and may impart dark colors to the fruit and extracts made thereof. These off-flavors and colors often prevent or limit the use of the dried fruits and dried fruit extracts to the preparation of dilute teas and soups and products to which sugar, honey, and the like are added.

Moreover, luo han guo is seldom consumed as the fresh fruit due to the intense sweetness. The fresh juice is seldom used because of its instability and the resulting off-flavors that can rapidly develop. On crushing the fruit for the purpose of collecting its juice, an unpleasant vegetable odor and off-flavor generally results. Furthermore, the fresh juice of the luo han guo fruit has a natural pH of about 6 and it contains sugars which brown and ferment over time. Also, pectin present in the fruit may gel upon standing.

Additionally, luo han guo fruit must generally be peeled and seeded prior to use to prevent the formation of off-flavors that result from a reaction between the peel and seeds and the juice. Not only does peeling and seeding the fruit take additional time, it also adds expense to the preparation process.

There is, therefore, a need to provide an improved process for producing sweet juice, juice concentrate, and dried juice products, made from plant material containing terpene glycosides that overcomes the aforementioned problems traditionally associated with processing such plant material, and in particular, overcomes the need to peel and seed luo han guo fruit prior to use.

SUMMARY OF THE INVENTION

In one aspect, the present invention relates to a process for extracting juice from a crushed plant material containing terpene glycosides, the process comprising the steps of:
a) Crushing a plant material comprising terpene glycosides;
b) Blanching the crushed plant material in acidified water to obtain a puree, the puree comprising a juice extract and a plant solids residue;
c) Separating the juice extract from the plant solids residue;
d) Mixing an enzyme with the juice extract; and
e) Separating the juice extract from step (d) to obtain a sweet juice.

In another aspect, the present invention relates to a process for extracting juice from a crushed plant material that contains terpene glycosides, comprising the steps of:
a) Crushing a plant material comprising terpene glycosides;
b) Blanching the crushed plant material in acidified water to obtain a puree, the puree comprising a first juice extract and a first plant solids residue;
c) Separating the first juice extract from the first plant solids residue;
d) Mixing pectinase with the first juice extract and the first plant solids residue;
e) Separating the first plant solids residue comprising the pectinase to obtain an additional juice extract and an additional plant solids residue;
f) Combining the first and additional juice extracts; and
g) Separating the juice extract from step (f) to obtain a sweet juice.

In another aspect, the present invention, the plant material preferably comprises luo han guo fruit.

In still another aspect, the present invention relates to food, beverage and health care compositions comprising the sweet juice made in accordance with the process disclosed herein.

DETAILED DESCRIPTION OF THE INVENTION

A. Definitions

As used herein, the term "blanching" means heating of the crushed plant material or fruit by any means to inactivate the endogenous enzymes in the plant material. Preferred means of blanching disclosed herein include immersing the fruit in hot water (greater than about 85° C. (185° F.)) or contacting the fruit with steam.

As used herein, the term "comprising" means various components can be cojointly employed in the methods and compositions of this invention. Accordingly, the terms "consisting essentially of" and "consisting of" are embodied in the term comprising.

As used herein, the terms "crushing" and "mashing" are used interchangeably herein to describe any means by which the plant material or fruit is pulverized.

As used herein, the term "enzyme" is used to describe any enzyme, or enzyme combination, that does not substantially degrade the sweet mogrosides that are to be extracted from the plant material or fruit. Such enzymes include, but are not limited to, pectinase, amylase, or multienzyme combinations (e.g., pectinase, cellulase, glycosidase). Pectinase is preferably utilized herein.

As used herein, the terms "juice" or "sweet juice" are used interchangeably to describe the liquid obtained after the final separation in the present process. The sweet juice may be used immediately in food, beverage or health care compositions, or alternatively, the sweet juice may be further processed, such as by concentrating or drying.

As used herein, the term "juice extract" is used to describe the more liquid portion obtained from the separation of the puree. "Juice extract" applies equally to the first extract, as well as any additional extracts, obtained through repeating the process of mixing a plant solids residue with enzymes and/or water followed by separation, as described herein. It should be understood that the term "juice extract" is not limited to only a first extract, but includes any additional extracts resulting from repeating the extraction process. For example, "juice extract" includes a second, third, fourth, etc. juice extract obtained by mixing enzymes and/or water with a plant solids residue followed by separation. However, if the term "juice extract" is preceded by, for example, "first," then it is to be understood that the term "first juice extract" refers specifically to the first extract. Similarly, it should be noted that the term "additional juice extract(s)" may be used herein to mean any juice extract other than the first. Accordingly, the term "juice extract" applies equally to a single, or first, extract, as well as a combined extract that results from pooling multiple extractions obtained from repeated processing of a plant solids residue, unless specifically designated otherwise.

As used herein, the term "oxygen restricted" means a modified atmosphere with less than the normal amount of oxygen present in it. This may be achieved by blowing a slow stream of inert gas (e.g., nitrogen, carbon dioxide or other) over the fruit being mashed to provide a lower oxygen content and thus slow down the enzymatic reactions that produce off flavors.

As used herein, the terms "plant material" and "fruit" are used interchangeably to describe the plant material or fruit prior to blanching. The plant material or fruit consists of any inner meat, peel, seeds and/or pulp that may be present.

As used herein, the term "plant solids residue" is used to describe the more solid portion obtained from the separation of the puree. The plant solids residue contains the majority of the crushed peel, seeds and/or pulp present in the fruit. Additionally, "plant solids residue" applies to the first residue, and any additional plant solids residues, obtained through the process of mixing with enzymes and/or water and separating described herein. It should be understood that the term "plant solids residue" is not limited to only a first residue, but includes any additional residues resulting from repeating the extraction process. However, if the term "plant solids residue" is preceded by, for example, "first," then it is to be understood that the term "first plant solids residue" refers specifically to the first residue. Similarly, it should be noted that the term "additional plant solids residue(s)" may be used herein to mean any plant solids residue other than the first. Thus, "plant solids residue" may include a first, second, third, fourth, etc. plant solids residue obtained by the initial separation of the plant material, or by mixing enzymes and/or water with a plant solids residue followed by separation, unless otherwise designated.

As used herein, the term "puree" is used to describe the plant material or fruit after crushing and blanching, but prior to separation. The puree comprises an element selected from the group consisting of crushed, blanched inner meat, peel, seeds, pulp or combinations thereof. The puree preferably comprises the peel and seeds.

As used herein, the terms "separating" and "separation" are used interchangeably to describe any means of processing any of the following in order to separate insoluble material from liquid: the puree, so as to obtain a juice extract and plant solids residue; the plant solids residue with added enzymes and/or water to obtain additional juice extracts; or, the final juice extract so as to obtain a sweet juice. While any suitable method known to those skilled in the art is acceptable, filtering, centrifuging, decanting, and combinations thereof are preferred.

All ratios, proportions and percentages herein are by weight, unless otherwise specified.

B. Process

The present invention relates to a process for extracting juice from plant material that contains terpene glycosides and the use of that juice in food, beverage or health care compositions.

1. Selecting the Plant Material

There are several plant or botanical sources that exist which contain terpene glycosides, such as mogroside V. The most common source of terpene glycosides are plants from the Cucurbitaceae family, namely tribe Jollifieae, subtribe Thladianthinae, genus *Siraitia*. Especially preferred among the Cucurbitaceae family are the genus/species *S. grosvenorii, S. siamensis, S. silomaradjae, S. sikkimensis, S. siraitia, S. borneensis* and *S. taiwaniana*. The most preferred fruit of the Cucurbitaceae family is *S. grosvenorii*, which is commonly referred to as luo han guo or luo han kuo. Although the process and compositions described herein will often make specific reference to luo han guo, it will be understood that such process and compositions are not limited thereto. Indeed, any plant or botanical material containing terpene glycosides, and in particular, sweet triterpene glycosides or mogrosides, are acceptable for use herein.

2. Crushing the Plant Material

The fresh plant material, which is most preferably luo han guo fruit, is sorted to remove/avoid decayed fruit, stored and processed to provide a juice with a high level of sweetness and a low level of off flavors and odors. Under the current process, it is unnecessary to separate the outer peel of the plant material from the inner meat. Nor is it necessary to remove the seeds or pulp before processing. These aspects will be fully addressed below.

Typically, the luo han guo fruit is picked while at a slightly under ripe state and allowed to ripen during storage. Alternatively, the fruit may be allowed to fully ripen on the vine. During the final stages of ripening, some moisture is lost from the fruit and there is a slight contraction of the inner fruit and separation from the outer peel. Also, the level of sweetness increases. Under-ripe fruit is more firm, tends to be less sweet and may be bitter. Ripe fruit infected by insects such as fruit fly larvae, rapidly decays and should be removed and discarded. Many lots of fruit produced by farmers are collected at a central processing facility where the fruit is then preferably sorted by hand or machine to remove all partially or wholly decayed fruit, broken fruit, or fruit damaged by insects. Ripe fruit is selected for processing while semi-ripe fruit is stored within the processing plant for a further period to fully ripen before processing.

Then the fruit is typically thoroughly washed to remove all adhering dirt, preferably using disinfectant solutions. Washing may be accomplished by dumping the fruit into troughs of moving water, separating the fruit from the water, and spray washing the fruit. The fruit can also be treated with strong water sprays as they move along a roller-type conveyor. The wash water may contain chlorine (about 5 ppm to about 20 ppm) or other disinfectant, such as peroxyacetic acid.

The washed and sorted fruit is typically prepared for extraction by crushing, using for example, a pin mill. Unlike previous terpene glycoside extraction processes, it is not necessary to peel or seed the fruit prior to crushing or mashing. Typically, peeling was done to prevent off-flavor formation that resulted from juice and peel contact. This need for peeling and seeding is discussed at column 3, lines 50-60 in U.S. Pat. No. 5,411,755, issued on May 2, 1995 to Downton et al. However, the present inventors have surprisingly discovered that utilizing the processing methods disclosed herein, these steps are no longer required to prevent the formation of off-flavors, and thus, the whole fruit may be used.

Optionally, but preferably, the fruit is crushed in an oxygen-restricted atmosphere. Equipment used for crushing apples, potatoes and other soft fruits and vegetables can be used to pulverize the fruit core, such that seed break-up is minimal. One type of mashing apparatus, a Ratz Muhle (manufactured by Lauffer Company, in Horb, Germany), grates the fruit to a mash; a hanuner mill, or pin mill (e.g., Fitzmill®, made by Fitzpatrick Company, Elmhurst, Ill.) can be used to comminute the fruit.

Other common apparatus for crushing the fruit include, but are not limited to, 1) hydraulic cider press, 2) pneumatic juice press, 3) continuous screw type press, 4) continuous plate press, 5) semi-continuous plate press, 6) horizontal basket press, 8) screening centrifuge, 7) rack and cloth press, and 9) continuous belt press. Juice pressing methods are described in Nelson et al., Fruit and Vegetable Juice Processing Technology, AVI Publishing Co., pp 216-229 (1980).

The crushed fruit, as it comes from the mashing process, may contain elements such as inner fruit meat, peel, seeds, pulp and mixtures thereof.

3. Blanching the Crushed Plant Material

Once crushed, the fruit, including the inner meat, peel, seeds and pulp, is blanched. Blanching is primarily done to inactivate the endogenous enzymes found in the fruit, and can be carried out in several ways. One method for blanching the fruit is water blanching. Water blanching consists of plunging the fruit mash, immediately after crushing, into hot water at a temperature of greater than about 85° C. (about 185° F.), and keeping it at that temperature for at least about 25 minutes, preferably between about 25 and about 50 minutes.

Another method of blanching suitable for use herein is steam blanching. Steam blanching comprises steaming the freshly crushed fruit mash while it moves on a continuous belt within a steam chamber. The temperature of the fruit mash during steaming is preferably greater than about 85° C. (about 185° F.), and the steaming continues for at least about 25 minutes, preferably between about 25 and about 50 minutes.

While either method of blanching is suitable for use herein, water blanching is preferred.

Luo han guo fruit has an active lipoxygenase enzyme system that readily oxidizes natural lipids in the fruit to volatile compounds that contribute vegetable/beany odors and off-flavors. Blanching of the fruit mash immediately after crushing effectively inactivates the lipoxygenase and other endogenous enzymes (e.g. proteases), thereby minimizing off-flavor formation. Blanching also allows for multiple extractions of the plant solid residue without developing enzyme-catalyzed off-flavors, which significantly increases the extraction yield.

Additionally, the present inventors have surprisingly discovered that blanching the crushed fruit in acidic conditions helps prevent the formation of off-flavors typically associated with the interaction of the peel, juice and seeds. This exciting discovery allows the whole fruit to be processed and eliminates the need for the extra steps of peeling and seeding the fruit prior to processing. Preferably, the fruit is blanched under acidic conditions, wherein the pH of the blanch water is less than about 5, more preferably from about 3.5 to about 4.5, and most preferably from about 3.8 to about 4.2.

Suitable acids for use in this portion of the process include a variety of organic and inorganic acids. Preferably, the acid is citric acid, malic acid, or combinations thereof.

The pH of the blanching water may be checked periodically and adjusted to the target pH range with a solution of citric acid. During steaming, the condensate from the steam belt may be collected and the pH adjusted to less than about 5, more preferably from about 3.5 to about 4.5, and most preferably from about 3.8 to about 4.2, with, for example, citric acid.

As aforementioned, the blanching temperature is preferably at least about 85° C., more preferably at least about 90° C., and most preferably from about 95° C. to about 100° C. The blanching time is at least sufficient to substantially inactivate the endogenous enzymes in the plant material. Blanching time is at least about 25 minutes, preferably between about 25 minutes and about 50 minutes.

The puree resulting from blanching the crushed plant material can be immediately subjected to the remaining processing steps of the claimed invention, or it can be stored refrigerated or frozen for a period of time and then subjected to the remaining processing steps leading to a sweet juice at a later time. Partial processing of the plant material or fruit (through the blanching step), followed by refrigerated or frozen storage of the partially processed puree, could be advantageous during the height of the harvest season for minimizing post-harvest losses resulting from over-ripening and/or spoilage of the fresh fruit.

4. Separating the Blanched Plant Material

After blanching of the fruit is complete, the resulting puree, which may still contain the peel, seeds and/or pulp, can then be separated to obtain a juice extract and a plant solids residue.

Many separation methods are available to separate the puree into a juice extract and plant solids residue. However, the preferred methods for separating the puree include, but are not limited to, filtering, centrifuging, decanting and combinations thereof.

a. Filtering

Filtering can be achieved by one or more methods that essentially separate the juice extract from the plant solids residue. For example, plate filters, both horizontal and vertical, and rotary filters equipped with a procter blade that removes the plant solids residue as the filter drum turns, may be used. Filters which allow easy removal of the plant solids residue for purposes of re-extraction are preferred.

b. Centrifuging

Centrifuging can be applied in either batch or continuous mode. Basket centrifuges can be used for batch mode applications. When using basket centrifuges, the juice extract is removed from the puree due to the centrifugal force and the plant solids residue is kept back within the spinning basket. The basket is removed at the end of a run and the plant solids residue is transferred to an extraction tank for subsequent extractions with enzymes. This re-extraction process is explained in greater detail below.

Decanter centrifuges are usually applied in continuous mode. When using decanter centrifuges, the fruit slurry or puree is fed to a decanter centrifuge and the clarified juice extract is removed from the decanter. The plant solids residue is removed by a back drive and is easily available for re-extraction purposes. Decanting is particularly amenable to a continuous process where the blanched fruit puree is pumped into a decanter and the first juice extract is separated from the plant solids residue. Then the plant solids residue is re-extracted and re-decanted. This unit operation can be continued for the requisite amount of time for processing several streams of re-extracted fruit slurries.

c. Decanting

In the absence of basket or decanting centrifuges, simple decanting can be employed as a means of separating the juice extract from the plant solids residue. When using decanting, the juice extract may be decanted by tilting the extraction tank and creating a dam over which the plant solids do not flow. Preferably the juice extract may be siphoned off under gravity until the plant solids residue is free of juice extract. This unit operation can be repeated to ensure a high level of juice extract removal. However centrifugal methods of juice extract removal are preferred.

After separation, the resulting juice extract and plant solids residue are allowed to cool, if necessary, to from about 35° C. to about 65° C., preferably from about 40° C. to about 60° C., and most preferably from about 45° C. to about 55° C. within about 5 min., preferably within about 2 min., after separation. This cooling prepares the juice extract and plant solids residue, for further processing with enzymes.

5. Mixing Enzymes

Once the fruit puree has been separated into a juice extract and a plant solids residue, enzymes are mixed with the juice extract and optionally, with the plant solids residue, for further processing. In the juice extract, the enzymes work to destabilize the suspended pectins and also consequently aid in precipitation of the heat stable proteins during an optional subsequent thermal treatment step, thereby helping to clarify the juice. When used with the plant solids residue, the enzymes work to help optimize the release of extractable components.

More specifically, in the juice extract, enzymes displaying a pectinase activity degrade the suspended pectins, which impart a cloud to the raw juice. This depectinizing action also destabilizes the associated protein, which seems to owe its heat stability to the pectin. As a result, the proteins are denatured and precipitated under relatively mild heating conditions during the subsequent thermal treatment step. The relatively mild heat treatment to precipitate the soluble protein results in reduced brown color formation in the final juice.

In the plant solids material, residual extractable components remain after the initial separation step. Therefore, it is preferable to further process the plant solids residue in an effort to extract additional terpene glycosides and increase the yield of such terpene glycosides in the final sweet juice. To obtain these additional terpene glycosides and enhance the overall yield, enzymes and additional water are mixed with the plant solids residue under the conditions discussed below, such that the plant solids residue may again be separated so as to obtain an additional juice extract and an additional plant solids residue. This process may be repeated as necessary to ensure optimal extraction of terpene glycosides from the plant solids residue.

There are several enzymes that are suitable for use in the present process. For example, pectinase, amylase, or multi-enzyme combinations (e.g., pectinase, cellulase, glycosidase) may be used. Generally, any enzyme, or enzyme combination, may be used in the present process as long as the enzymes do not substantially degrade the sweet terpene glycoside compounds (e.g. mogrosides) present in the fruit. Moreover, it is not necessary for the same enzyme to be mixed with both the juice extract and the plant solids residue. However, pectinase is a preferred enzyme for use with both the juice extract and the plant solids residue because it not only removes pectin from the juice extract to provide clarity and prevent gelling, but also works to optimize the release of extractable components remaining in the plant solids residue. Thus, pectinase is preferred for use with both the juice extract and the plant solids residue. In general, proteases should be avoided in the treatment of the juice extracts or the plant solids residue, to avoid the excessive formation of free amino acids. Some of these amino acids, in particular the sulfur-containing amino acids, tend to impart a sulfurous odor to the juice extract. This odor generation should be minimized.

Suitable amounts of enzymes, particularly pectinase, added to the juice extract (generally as a dilute solution) are from about 0.001% to about 1%, preferably from about 0.002% to about 0.5% (dry extract basis). E.g., for 1 liter of juice extract with about 9% dry extract solids, about 0.0018 to about 0.45 g of enzyme is added. The pectinase-juice extract mixture is then incubated. During incubation, the pectinase is allowed to react with the juice extract preferably until it is substantially free of pectin, typically for at least about 0.5 hr., preferably from about 1 hr. to about 2 hr., at a temperature of from about 40° C. to about 60° C., preferably from about 45° C. to about 55° C.

Similarly, suitable amounts of enzymes, particularly pectinase, added to the plant solids residue are from about 0.002% to about 0.5%, preferably from about 0.005% to about 0.25% (dry plant solids residue basis). Additionally, it is preferable to add water to the plant solids residue/enzyme mixture to aid in the repeated extractions. Suitable amounts of water for use in this manner are less than about 100%, preferably from about 85% to about 65%, and more preferably about 80% to about 70% of the mass of the starting fresh fruit. The pectinase is allowed to react with the re-hydrated plant solids residue preferably until the residue is substantially free of extractable components, typically for less than about 60 minutes, preferably from about 45 minutes to about 60 minutes, at a temperature of from about 40° C. to about 60° C., preferably from about 45° C. to about 55° C.

Following incubation of the plant solids residue with the added enzyme, the residue is separated to obtain an additional juice extract and an additional plant solids residue. As described previously, separation may be by filtering, centrifuging, decanting, or a combination thereof.

As stated above, the process of mixing enzymes and/or water with the plant solids residue and separating may be carried out several times to optimize the terpene glycoside extraction. To illustrate, a second plant solids residue may again be mixed with water and/or enzymes, and separated so as to obtain a third juice extract and third plant solids residue. This process may be carried out a fourth, fifth or any additional number of times as necessary to ensure optimal extraction of the terpene glycosides. Indeed, the terms "juice extract" and "plant solids residue" are used herein to mean the first and any additional extract or residue resulting from repeated extractions.

Once all the juice extracts are obtained, whether there is only a first juice extract, or a first and additional extracts, all extracts are combined for further processing of the juice extract.

6. Thermally Treating the Juice Extract

Preferred processes of the present invention include a heating step in order to denature and precipitate any soluble proteins and added enzymes in the juice. Denaturation and precipitation of enzymes and proteins helps preserve the flavor and stability of the extract. Removal of the residual heat stable proteins that have survived the depectinizing step helps ensure a stable, cloud free luo han guo juice. The thermal treatment may be carried out from about 70° C. to about 110° C., preferably from about 80° C. to about 100° C. for at least about 20 minutes, preferably at least about 25 minutes and more preferably at least about 30 minutes. Preferably it may be carried out from about 90° C. to about 100° C. for about 30 to about 60 minutes and more preferably it is carried out from about 95° C. to about 100° C. for about 30 minutes. The thermally treated juice extract is preferably cooled to room temperature within about 30 minutes, preferably within about 5 to about 10 minutes, after heating.

7. Separating the Juice Extract to Obtain a Sweet Juice

At this point in the process, it is preferable to again separate the juice extract for further purification and to remove any remaining solids, such as pulp and precipitated protein. While any of the methods of separation discussed above, such as filtration or centrifugation, are suitable for use in this portion of the process, filtration is the preferred method of separation, and in particular, microfiltration.

Microfiltration may be carried out using a polymeric, ceramic, stainless steel or any other type of filtration device capable of separating solid materials of nominal diameter less than or equal to about 0.5 µm from the juice extract. Tangential flow filtration is preferred, where the liquid flow occurs in parallel to the membrane surface and the filtrate is collected in a "permeate tube" placed at the center of the membrane in the case of a polymeric micro filter. Other types of membranes may have the filtered juice being collected at the outer surface of the membrane.

A pre-filtration step will in most cases precede the final microfiltration step. The pre-filtration removes large flocculated or precipitated organic material. The pre-filtration may be achieved by any one of the steps described in detail previously, namely filtration, centrifugation or decanting.

The final micro-filtered sweet juice has a clear appearance without cloudiness, a light golden color, and a clean lingering sweetness without off-flavors. The soluble solids level of the sweet juice is typically about 6° Brix to about 15° Brix. The pH of the sweet juice is preferably between about 3.5 and about 4.5, more preferably the pH is between about 3.8 to about 4.2.

8. Optional Steps for Further Treatment of the Juice a. Concentration

An evaporator or other concentrating equipment may be used to remove certain volatiles from the sweet juice and preferably to concentrate the sweet juice. Standard evaporation under reduced temperatures and lower pressure can be used. Evaporation removes undesirable flavor notes and also some water. Evaporation should be carried out such that artificial, cooked or manufactured flavors are minimized or totally eliminated. Therefore, low temperatures and/or times are preferred for such evaporation.

A multi-stage, multi-effect vacuum evaporator such as the TASTE (thermally accelerated short time evaporator available from Cook Machinery Corporation, Dunedin, Fla.) can be used. The temperature profile is preferably controlled so that the maximum sweet juice temperature is from about 40° C. to about 90° C. The evaporator can be operated using either forward flow or mixed flow.

In each case, forward or mixed flow, the steam and vapor flow in the first effect (vessel with steam flow), and in subsequent effects, is in the same pattern. The juice vapor starts at the highest pressure and ends at the stage with the lowest pressure. Any suitable vacuum system can be used to remove non-condensables, but typically this will be a multi-stage steam ejector system. The process is preferably operated at pressures of about 2 inches (50 mm) to about 4 inches (100 mm) of mercury absolute.

In a multiple effect evaporator, steam is used only on the first effect and each subsequent effect is heated by vapor evaporated in the preceding stage. This vapor is primarily water, but it also contains volatile materials originally in the sweet juice. These volatiles can be recovered if desired by removing part of the vapors from the heating side of the evaporation effect. This removal stream can be passed through a series of fractionators, condensers, and coolers to obtain a cold liquid essence rich in volatile fractions. This procedure is commonly practiced in the industry.

Newer types of evaporators such as the narrow bore ascending liquid column evaporator, Sigma Star (available from Schmidt GmbH., Bretten, Germany), are preferably applied. Also, a wiped film evaporator with the condenser built directly into the center of the wiped film evaporator, as in the short path evaporator manufactured by Leybold-Heraeus, Hanau, Germany, for oil separation/distillation, is preferably applied.

For small scale batches, a rotary or centrifugal evaporator, such as a centritherm can be used.

The evaporated concentrate may be cooled and can be stored either refrigerated (about 0° C. to about 10° C.) or frozen (about −18° C.).

A reverse osmosis membrane process may also be used to concentrate the sweet juice. Reverse osmosis uses a membrane that is semi-permeable, allowing the water that is being removed to pass through it, while retaining the juice solids. Most reverse osmosis technology uses a process known as cross-flow to allow the membrane to continually clean itself. As some of the water passes through the membrane the dilute juice extract continues downstream, 'sweeping' the membrane. The process of reverse osmosis requires a driving force to push the water through the membrane, and the most commonly used force is pressure from a pump. The higher the pressure, the larger the driving force. As the concentration of the juice solids being retained increases, the driving force required to continue concentrating the fluid (i.e. force required to pump out the water) increases.

Reverse osmosis is capable of retaining most juice constituents that have a molecular weight of greater than about 150-250 Daltons. The separation of ions with reverse osmosis is aided by charged particles. This means that dissolved ions that carry a charge, such as salts, are more likely to be retained by the membrane than those that are not charged, such as organics. The larger the charge and the larger the particle, the more likely it will be retained. Beyond about 25% juice solids the osmotic force required to be overcome for removal of water becomes very high and reverse osmosis becomes very inefficient. Then it is best to continue concentration by the use of thermal means under reduced pressure.

The juice is preferably concentrated to a typical concentration of from about 6° to 24° Brix to about 15° to 65° Brix. Preferably the concentrated juice has a concentration of from about 35° Brix to about 65° Brix. As used herein, "Brix" is essentially equal to % soluble solids content.

b. Drying

Drying is usually accomplished by applying heat to evaporate the water in the juice concentrate. Two main types of drying are employed in making dry juice solids, namely, drying under vacuum or drying at atmospheric pressure. Vacuum drying is generally more expensive than drying at atmospheric pressure because the vacuum has to be maintained for a long period of time. Here, drum drying and freeze drying are usable options. Atmospheric drying can be carried out using a spray drier. This is the preferred method of drying the concentrated juice. Here, the concentrated juice is fed with heated air into a chamber. The juice concentrate is introduced into the drying chamber by atomization or a spray through a fine nozzle. The liquid particles may be dried in a co-current fashion i.e. the particles and hot air moving in the same direction. They may also be dried in a counter-current fashion i.e. the particles moving against a current of hot air within the chamber. A carrier, such as maltodextrin, may be blended with the sweet juice or the juice concentrate prior to spray drying. This will yield a spray dried powder comprising juice solids and maltodextrin solids that may be more resistant to moisture absorption and the associated problems of particle clumping and stickiness.

Drying reduces the moisture content to about 5%, and preferably to about 34%.

c. Addition of Preservatives:

A preservative, such as a sorbate or benzoate salt or combinations thereof, may optionally be added to the juice extract, the final sweet juice, or the concentrated juice in order to increase the microbiological stability of the product.

9. Using the Extracted Juice in Food, Beverage or Health Care Compositions

The present invention includes sweet juice compositions made from Cucurbitaceae fruit according to any of the above processes. As previously described, the sweet juice may be used 'as is,' concentrated or dried.

Typically the sweet juice compositions of the present invention may comprise, on a dry weight basis, from about 20% to about 60% sugars, such as glucose, fructose and sucrose; from 0% to about 25% protein (includes free amino acids and/or peptides); from 0% to about 4% fat; from about 1% to about 6% ash; from about 5% to about 20% organic acids, such as citric acid and malic acid; from 0% to about 2% vitamin C; and from 0% to about 10% other materials.

The present compositions may comprise, on a dry weight basis, from about 0.1% to about 25% mogrosides, preferably from about 1% to about 22% mogrosides, more preferably from about 4% to about 20% mogrosides, and most preferably from about 7% to about 15% mogrosides.

Sweet juice compositions of the present invention, especially when concentrated or dried, can be used to provide natural sweetness for many purposes. Examples of such uses include, the use in beverages, such as tea, coffee, flavored milk, carbonated soft drinks, fruit juice, fruit-flavored beverages and powdered drink mixes; foods, such as jams and jellies, peanut butter, pies, puddings, cereals, candies, ice creams, yogurts, popsicles; and health care products, such as dentifrices, mouthwashes, cough drops, cough syrups; chewing gum; and as a sugar substitute.

Sweet juice compositions of the present invention can be blended with other fresh sterilized or pasteurized juice to make lower calorie (lower sugar) beverage products. On a volume/volume basis, blends of from about 10:1 to about 1:100 are preferred.

The juice from the present invention process can be blended with other juices and flavors to make low calorie beverages. Such other juices include apple, cranberry, pear, peach, plum, apricot, nectarine, grape, cherry, currant, raspberry, gooseberry, blackberry, blueberry, strawberry, lemon, orange, grapefruit, potato, tomato, lettuce, celery, spinach, cabbage, watercress, dandelion, rhubarb, carrot, beet, cucumber, pineapple, custard-apple, pomegranate, guanabana, kiwi, mango, papaya, banana, watermelon, passion fruit and cantaloupe. Preferred other juices are apple, pear, lemon, grapefruit, cranberry, orange, strawberry, grape, kiwi, pineapple, passion fruit, mango, guava, cherry, rosehips, lychee, water chestnuts and cane sugars. Citrus juices are preferred for blending with the present invention juices because of their high acidity.

Citrus juice blends can also contain citrus pulp. From 0% to about 19% (v/v) pulp is generally acceptable. Preferably, the amount of pulp will be about 3% to about 12% (volume/volume) and be about 0.50 mm to about 5 mm in size.

Flavors selected from natural flavors, botanical flavors and mixtures thereof can be added to the sweet juice of the present invention. The term "fruit flavors" refers to those flavors derived from the edible reproductive part of a seed plant, especially one having a sweet pulp associated with the seed. Also included within the term "fruit flavor" are synthetically prepared flavors made to simulate fruit flavors derived from natural sources.

The term "botanical flavor" refers to flavors derived from parts of a plant other than the fruit: i.e. derived from bean, nuts, bark, roots and leaves. These include spice flavors. Also included within the term "botanical flavor" are synthetically prepared flavors made to simulate botanical flavors derived from natural sources. Examples of such flavors include cocoa, chocolate, vanilla, coffee, kola, tea, cinnamon, clove and the like. Botanical flavors can be derived from natural sources such as essential oils and extracts, or can be synthetically prepared.

The particular amount of the flavor component effective for imparting flavor characteristics to the beverages of the present invention ("flavor enhancing") can depend upon the flavor(s) selected, the flavor impression desired, and the form of the flavor component. The flavor component can comprise at least about 0.001% by weight of the beverage composition, preferably from about 0.01% to about 10%. When fresh juices are used as the flavor, the level of juice can be from about 0.05% to about 65%.

EXAMPLES

Example 1

Luo han guo fruit is sorted to remove under-ripe and damaged fruit. A 35 kg lot of high-quality, ripe fruit is separated from the bulk. This lot of fruit is washed with water to remove surface dirt and then rinsed in a solution of peroxyacetic acid (Tsunami®, Ecolab Inc., Shanghai, China) to reduce surface microbial counts.

The fruit is crushed in a pin mill and the resulting fruit mash is blanched in a solution of citric acid (14 L) having a pH of about 4 and a temperature of about 88-90° C. The fruit is blanched for about 45 minutes, with the temperature being maintained at about 88-90° C. throughout this period. The resulting puree is decanted to remove juice extract and the residual plant solids are then centrifuged in a basket centrifuge (2000×g, about 10 min.) to separate and collect the remaining juice extract, which is then combined with the decanted juice extract.

The juice extract (26.6 kg, 8.8° Brix) is cooled to about 50° C. and 2 mL of Pectinex XXL® pectinase enzyme preparation (Novozymes A/S, Beijing, China) is added with mixing.

This first juice extract/pectinase mixture is maintained at a temperature of about 45-50° C. for about one hour in order to depectinize the extract.

The plant solids residue remaining after centrifugation is treated with about 2 mL Pectinex XXL® (Novozymes A/S, Beijing, China) dissolved in about 22 L of water warmed to about 55° C. The rehydrated plant solids are thoroughly mixed and then incubated at about 50° C. for about 45 minutes.

At the end of the incubation period, the rehydrated plant solids are first decanted and then centrifuged as before to remove and collect the juice extract. This second juice extract (13 kg, 4.4° Brix) is added to the first juice extract, while the remaining plant solids residue is again rehydrated with 13 kg of warm (50° C.) water and held at a temperature of about 50° C. for about 45 minutes.

This unit operation is repeated one more time and the final combined juice extract (311 kg, 6.2° Brix) is put into a steam jacketed kettle and boiled for about 30 minutes. After boiling, the juice extract is cooled to room temperature and filtered first via a filter cloth (10 μm mesh size) to remove the large precipitated particles, and then subjected to microfiltration using a ceramic membrane (0.2 μm pore size) to obtain a sweet juice.

The microfiltered luo han guo juice is light in color and has a clean, sweet taste. Its odor is slightly fruity and there are no objectionable odors or off-flavors.

Example 2

A 70 kg lot of ripe luo han guo fruit is washed with water to remove surface dirt and then rinsed in Tsunami® (Ecolab Inc., Shanghai, China) solution to reduce surface microbial counts. The fruit is crushed in a pin mill and the resulting fruit mash is plunged into a pH 4 solution of citric acid (28 L) at a temperature of about 88-90° C. and maintained for about 45 minutes.

The resulting puree is decanted to remove the juice extract (40.2 kg, 8.5° Brix) and the remaining plant solids residue is re-suspended in 40 L of 50° C. water, which is acidified to a pH of about 4 using citric acid. About 35 mL of a pectinase enzyme solution is added to the rehydrated plant solids and the resulting blend is thoroughly mixed. The blend is incubated at about 50° C. for about 60 minutes. The juice extract is cooled, if necessary, to about 50° C. and about 3 mL of Pectinex XXL® (Novozymes A/S, Beijing, China) is added with mixing. The juice extract is maintained at a temperature of about 45-50° C. for about one hour in order to depectinize the extract.

At the end the incubation period, the rehydrated plant solids are decanted as before to obtain a second juice extract (36.4 kg, 3.9° Brix). The second juice extract is combined with the first juice extract. The remaining plant solids residue is then re-suspended in 36 kg of acidified (pH 4) water and maintained at a temperature of about 50° C. for about 60 minutes.

At the end of the incubation period, the above steps are repeated on the plants solids residue so as to obtain a third and a fourth juice extract.

The third juice extract weighs about 37.2 kg and is about 2° Brix.

The fourth juice extract weighs about 38.4 kg and is about 1.2° Brix.

All of the juice extracts are combined and boiled in a steam jacketed kettle for about 45 minutes. The extracts are then cooled to room temperature and the large flocculated particles are removed by filtering the extract through a filter cloth (10 μm mesh size). The sweet juice is then subjected to microfiltration via a 0.2 μm ceramic membrane with a back pressure of about 300 kPa.

The microfiltered luo han guo sweet juice is light in color and has a clean sweet taste with no objectionable odors or off-flavors.

The juice is then evaporated at about 50° C. under vacuum in an evaporation kettle to about 60° Brix. The weight of the resulting luo han guo concentrate is about 10.3 kg.

Example 3

An all-natural, reduced sugar/reduced calorie orange juice is prepared using the following formulation.

| Ingredient | Wt % | Weight (g) |
| --- | --- | --- |
| Pasteurized Orange Juice (11.6° Brix; pH 4.0; no pulp) | 72.073 | 720.73 |
| Filtered Water | 27.407 | 274.07 |
| Luo han guo concentrate (60° Brix; from Example 2) | 0.186 | 1.86 |
| Citric Acid | 0.086 | 0.86 |
| Natural Color (1:10 dilution in water of Exberry Shade Orange #420036; GNT USA, Inc., Tarrytown, NY) | 0.144 | 1.44 |
| Natural Orange Flavor (Mane, Inc., Milford, OH) | 0.104 | 1.04 |
| Total | 100.000 | 1,000.00 |

The ingredients are blended together in the order listed and the resulting blend is thoroughly mixed until all ingredients are in solution. The finished juice is bottled and stored refrigerated. The finished juice has a Brix reading of 8.6° Brix, a pH of 3.87, and is about 25% lower in sugar and calories compared to 100% orange juice. The finished juice tastes very similar to 100% orange juice.

Example 4

A reduced sugar/reduced calorie root beer flavored carbonated soft drink is prepared using the following formulation.

| Ingredient | Wt % | Weight (g) |
| --- | --- | --- |
| Carbonated Water | 91.38 | 913.8 |
| Sugar | 8.00 | 80.0 |
| Luo han guo concentrate (60° Brix; from Example 2) | 0.29 | 2.9 |
| Natural Flavor (Mane, Inc., Milford, OH) | 0.20 | 2.0 |
| Caramel Color (D.D. Williamson & Co., Louisville, KY) | 0.08 | 0.8 |
| Sodium Benzoate | 0.05 | 0.5 |
| Total | 100.000 | 1,000.00 |

The ingredients are blended together in the order listed and the resulting blend is thoroughly mixed until all ingredients are in solution. The finished soft drink has a Brix reading of 8.3° Brix, a pH of 4.5, and contains approximately 33% less sugar and 33% fewer calories than a full-sugar root beer soft drink. The finished soft drink tastes very similar to the full-sugar root beer.

Example 5

A reduced sugar/reduced calorie chocolate milk beverage is prepared using the following formulation.

| Ingredient | Wt % | Weight (g) |
| --- | --- | --- |
| Low Fat Milk (2% milkfat) | 95.896 | 500.0 |
| Sugar | 2.301 | 12.0 |
| Cocoa Powder | 1.534 | 8.0 |
| Luo han guo concentrate (60° Brix; from Example 2) | 0.173 | 0.9 |
| Sodium Carboxymethyl Cellulose | 0.096 | 0.5 |
| Total | 100.000 | 521.4 |

The sugar and luo han guo concentrate are dissolved in the milk. The cocoa powder and sodium carboxymethyl cellulose are then dispersed into the milk using a kitchen blender. The finished chocolate milk beverage has acceptable taste and contains about 20% less sugar and about 20% fewer calories than a full-sugar chocolate milk beverage.

Example 6

A reduced sugar/reduced calorie sugar cookie is prepared using the following formulation.

| Ingredient | Wt % | Weight (g) |
| --- | --- | --- |
| All-purpose Flour (sifted) | 32.40 | 324.0 |
| Sugar | 22.50 | 225.0 |
| Shortening | 20.00 | 200.0 |
| Egg | 9.60 | 96.0 |
| Isomalt (Palatinit of America, Inc., Morris Plains, NJ) | 6.50 | 65.0 |
| Polydextrose (Danisco USA, Inc., New Century, KS) | 6.00 | 60.0 |
| Filtered Water | 1.40 | 14.0 |
| Luo han guo concentrate (60° Brix; from Example 2) | 0.60 | 6.0 |
| Vanilla Extract | 0.40 | 4.0 |
| Baking Powder | 0.40 | 4.0 |
| Salt | 0.20 | 2.0 |
| Total | 100.00 | 1,000.0 |

The shortening, sugar, eggs, isomalt, polydextrose, water, luo han guo concentrate, and vanilla extract are blended together and thoroughly mixed. The flour, baking powder, and salt are mixed together separately and then added to the other ingredients with mixing to form a dough. The dough is kneaded until uniform and placed in the refrigerator to chill for about 1 hour. The resulting dough is divided into dough balls (10-13 g each) that are individually placed onto a lightly greased baking sheet and then baked in an oven at about 180° C. for about 8 minutes, or until baked to a light golden color, to produce finished cookies. The finished cookies have acceptable taste and texture and contain about 33% less sugar than full-sugar cookies.

Example 7

A reduced sugar/reduced calorie cough syrup is prepared using the following formulation.

| Ingredient | Wt % | Weight (g) |
| --- | --- | --- |
| Filtered Water | 33.257 | 332.57 |
| High Fructose Corn Syrup 55 (77% solids) | 20.000 | 200.00 |
| Propylene Glycol | 20.000 | 200.00 |
| Glycerol | 15.000 | 150.00 |
| Alcohol (95%) | 10.000 | 100.00 |
| Luo han guo concentrate (60° Brix; from Example 2) | 0.900 | 9.00 |
| Dextromethorphan Hydrobromide | 0.300 | 3.00 |
| Cherry Flavor | 0.200 | 2.00 |
| Citric Acid | 0.185 | 1.85 |
| Sodium Benzoate | 0.150 | 1.50 |
| Color (FD&C Red No. 40) | 0.008 | 0.08 |
| Total | 100.000 | 1,000.00 |

The dextromethorphan hydrobromide is first dissolved in the alcohol with mixing. The high fructose corn syrup, propylene glycol, glycerol, luo han guo concentrate, citric acid, sodium benzoate, and color are dissolved in the water with mixing. Then the dextromethorphan hydrobromide in alcohol solution and the flavor are added. The finished cough syrup is mixed until uniform and bottled.

All documents cited herein are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for extracting juice from a crushed plant material containing terpene glycosides, the process comprising the steps of:
   a) Crushing a plant material comprising terpene glycosides, wherein the plant material comprises the inner meat, peel, seeds, and/or pulp and has not been peeled or seeded prior to crushing;
   b) Blanching the crushed plant material of step a in acidified water for at least 25 minutes, immediately after crushing, to obtain a puree, the puree comprising a juice extract and a plant solids residue;
   c) Separating the juice extract from the plant solids residue;
   d) Mixing an enzyme with the juice extract; and
   e) Separating the juice extract from step (d) to obtain a sweet juice.

2. The process of claim 1 wherein the separating comprises a method selected from the group consisting of filtering, centrifuging, decanting and combinations thereof.

3. The process of claim 1 wherein the juice extract of step (d) is optionally thermally treated prior to separation.

4. The process of claim 1 further comprising mixing the enzyme with the plant solids residue.

5. The process of claim 4 further comprising separating the plant solids residue comprising the enzyme to obtain an additional juice extract and an additional plant solids residue, wherein the additional juice extract is added to the juice extract of step (e) prior to separating the juice extract to obtain a sweet juice.

6. The process of claim 1 wherein the crushed plant material is blanched in acidified water having a pH of less than about 4.5 and a temperature of at least about 85° C.

7. The process of claim 3 further comprising incubating the juice extract comprising the enzyme resulting from step (d) for about 1 hour at a temperature of from about 45° C. to about 55° C. prior to thermal treatment.

8. The process of claim 5 wherein the separating of the plant solids residue comprising the enzyme is carried out at least two additional times.

9. The process of claim 1 wherein the sweet juice of step (e) is further optionally treated by a method selected from the group consisting of concentrating and drying.

10. The process of claim 1 wherein the enzyme is selected from the group consisting of pectinase, amylase and mixtures thereof.

11. The process of claim 1 wherein the plant material is from the Cucurbitaceae family.

12. The process of claim 10 wherein the enzyme is pectinase.

13. The process of claim 11 wherein the plant material is luo han guo fruit.

14. A process for extracting juice from a crushed plant material that contains terpene glycosides, comprising the steps of:
   a) Crushing a plant material comprising terpene glycosides, wherein the plant material comprises the inner meat, peel, seeds, and/or pulp and has not been peeled or seeded prior to crushing;
   b) Blanching the crushed plant material of step a in acidified water for at least about 25 minutes, immediately after crushing, to obtain a puree, the puree comprising a first juice extract and a first plant solids residue;
   c) Separating the first juice extract from the first plant solids residue;
   d) Mixing pectinase with the first juice extract and the first plant solids residue;
   e) Separating the first plant solids residue comprising the pectinase to obtain an additional juice extract and an additional plant solids residue;
   f) Combining the first and additional juice extracts; and
   g) Separating the juice extract from step (f) to obtain a sweet juice.

15. The process of claim 14 wherein the plant material is luo han guo fruit.

16. The process of claim 14 wherein the crushed plant material is blanched in acidified water having a pH of less than about 4.5 and a temperature of at least about 85° C.

17. The process of claim 14 wherein the sweet juice of step (g) is further optionally treated by using a method selected from the group consisting of concentrating and drying.

18. A process for making a food, composition comprising:
   performing the steps of claim 1;
   combining the sweet juice with a food composition.

19. A process for making a beverage composition comprising:
   performing the steps of claim 1;
   blending the sweet juice with another juice to form a beverage composition.

20. A process for making a health care composition comprising:
   performing the steps of claim 1;
   combining the sweet juice with a health care product.

* * * * *